(12) United States Patent
Moe

(10) Patent No.: US 11,584,529 B2
(45) Date of Patent: Feb. 21, 2023

(54) SUPPLEMENTAL OXYGEN ASSEMBLIES

(71) Applicant: B/E Aerospace, Inc., Winston Salem, NC (US)

(72) Inventor: Daniel N. Moe, Mukilteo, WA (US)

(73) Assignee: B/E Aerospace, Inc., Winston Salem, NC (US)

(*) Notice: Subject to any disclaimer, the term of this patent is extended or adjusted under 35 U.S.C. 154(b) by 17 days.

(21) Appl. No.: 17/196,673

(22) Filed: Mar. 9, 2021

(65) Prior Publication Data

US 2022/0289388 A1 Sep. 15, 2022

(51) Int. Cl.
*B64D 11/06* (2006.01)

(52) U.S. Cl.
CPC .................. *B64D 11/0632* (2014.12)

(58) Field of Classification Search
CPC .......... B64D 2231/025; B64D 2231/00; B64D 2231/02; B64D 11/0632; A62B 7/14
See application file for complete search history.

(56) References Cited

U.S. PATENT DOCUMENTS

| 4,154,237 | A | * | 5/1979 | Courter | .................. | B64D 11/00 244/118.6 |
| 7,431,034 | B2 | | 10/2008 | Westphal et al. | | |
| 10,188,881 | B2 | * | 1/2019 | Antonini | .................. | A62B 7/14 |
| 2005/0263156 | A1 | * | 12/2005 | Westphal | ............... | B64D 25/00 128/205.13 |
| 2006/0201510 | A1 | | 9/2006 | Vogt | | |
| 2019/0126078 | A1 | * | 5/2019 | Lakies | .................. | B64D 11/00 |
| 2019/0209876 | A1 | | 7/2019 | Lakies | | |
| 2020/0317348 | A1 | * | 10/2020 | Krause | ............... | B64D 11/0632 |

FOREIGN PATENT DOCUMENTS

EP 1568398 A2 8/2005

OTHER PUBLICATIONS

Extended European Search Report issued by the European Patent Office, dated Aug. 3, 2022, in corresponding European Patent Application No. 22161127.0.

\* cited by examiner

*Primary Examiner* — Richard G Davis
(74) *Attorney, Agent, or Firm* — Locke Lord LLP; Daniel J. Fiorello; Gabrielle Gelozin

(57) ABSTRACT

A supplemental oxygen assembly for a vehicle can include a container and a flow assembly attached to and/or configured to be contained within the container in a stowed position and to extend from the container in a deployed position. The flow assembly can be configured to be connected to an oxygen supply to supply oxygen to a person in the deployed position. The supplemental oxygen assembly can include an extension device connected to the flow assembly. The extension device can be configured to extend or allow extension of the flow assembly toward an aisle of the vehicle to aid the flow assembly in being reached from or moveable toward an aisle of the vehicle by a person in the aisle.

14 Claims, 7 Drawing Sheets

SUPPLEMENTAL OXYGEN ASSEMBLIES

FIELD

This disclosure relates to supplemental oxygen assemblies, e.g., for vehicles.

BACKGROUND

In certain vehicles having supplemental oxygen assemblies, a crew member may have difficulty reaching an oxygen mask in an emergency where there are privacy barriers and/or other distance issues from an aisle to a location where the oxygen mask drops out. In some cases, regulations require certain access limits are met assuming a certain sized crew member. In view of this, traditional vehicles must limit the size/width of the passenger seating areas, and/or must limit the privacy features available in order to comply.

Such conventional methods and systems have generally been considered satisfactory for their intended purpose. However, there is still a need in the art for improved supplemental oxygen assemblies. The present disclosure provides a solution for this need.

SUMMARY

A supplemental oxygen assembly for a vehicle can include a container and a flow assembly attached to and/or configured to be contained within the container in a stowed position and to extend from the container in a deployed position. The flow assembly can be configured to be connected to an oxygen supply to supply oxygen to a person in the deployed position. The supplemental oxygen assembly can include an extension device connected to the flow assembly. The extension device can be configured to extend or allow extension of the flow assembly toward an aisle of the vehicle to aid the flow assembly in being reached from or moveable toward an aisle of the vehicle by a person in the aisle.

The extension device can include a lanyard connected to the flow assembly. The flow assembly can include a hose and a mask, for example. The lanyard can be connected to the hose.

The lanyard can be connected to an anchor in such a position as to be configured to weigh the flow assembly toward the aisle in the deployed position. The hose can be connected to a manifold within the container, and the anchor can be closer to the aisle than the manifold. In certain embodiments, the supplemental oxygen assembly can include a weighting streamer connected to the lanyard.

The extension device can include a moveable arm assembly. The moveable arm assembly can be configured to be contained within the container in the stowed position, and to extend the flow assembly or a lanyard attached to the flow assembly toward the aisle in the deployed position.

In certain embodiments, the moveable arm can be a telescoping arm assembly. For example, the telescoping arm assembly can include a biasing member attached to the container, and a telescoping arm biased toward the aisle by the biasing member and attached to the flow assembly or the lanyard at a distal portion of the telescoping arm.

In certain embodiments, the moveable arm assembly is a pivot arm assembly. The pivot arm assembly can include a torsional biasing member attached to the container, and a pivot arm biased by the torsional biasing member and attached to the flow assembly or the lanyard at a distal portion of the pivot arm.

In certain embodiments, the moveable arm assembly extends beyond the container toward the aisle. Any suitable extension (e.g., at least sufficient to meet regulatory compliance based on a particular seating arrangement or passenger privacy barriers) is contemplated herein.

In accordance with at least one aspect of this disclosure, a vehicle can include a supplemental oxygen assembly as disclosed herein, e.g., as described above. The vehicle can include one or more aisles and one or more passenger seats. The container can be positioned over the one or more passenger seats, for example.

The vehicle can be an aircraft, for example. Any other suitable vehicle is contemplated herein (e.g., train, a low pressure enclosure, e.g., hyperloop, vehicle).

These and other features of the embodiments of the subject disclosure will become more readily apparent to those skilled in the art from the following detailed description taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain figures, wherein.

DETAILED DESCRIPTION

Figure 1:
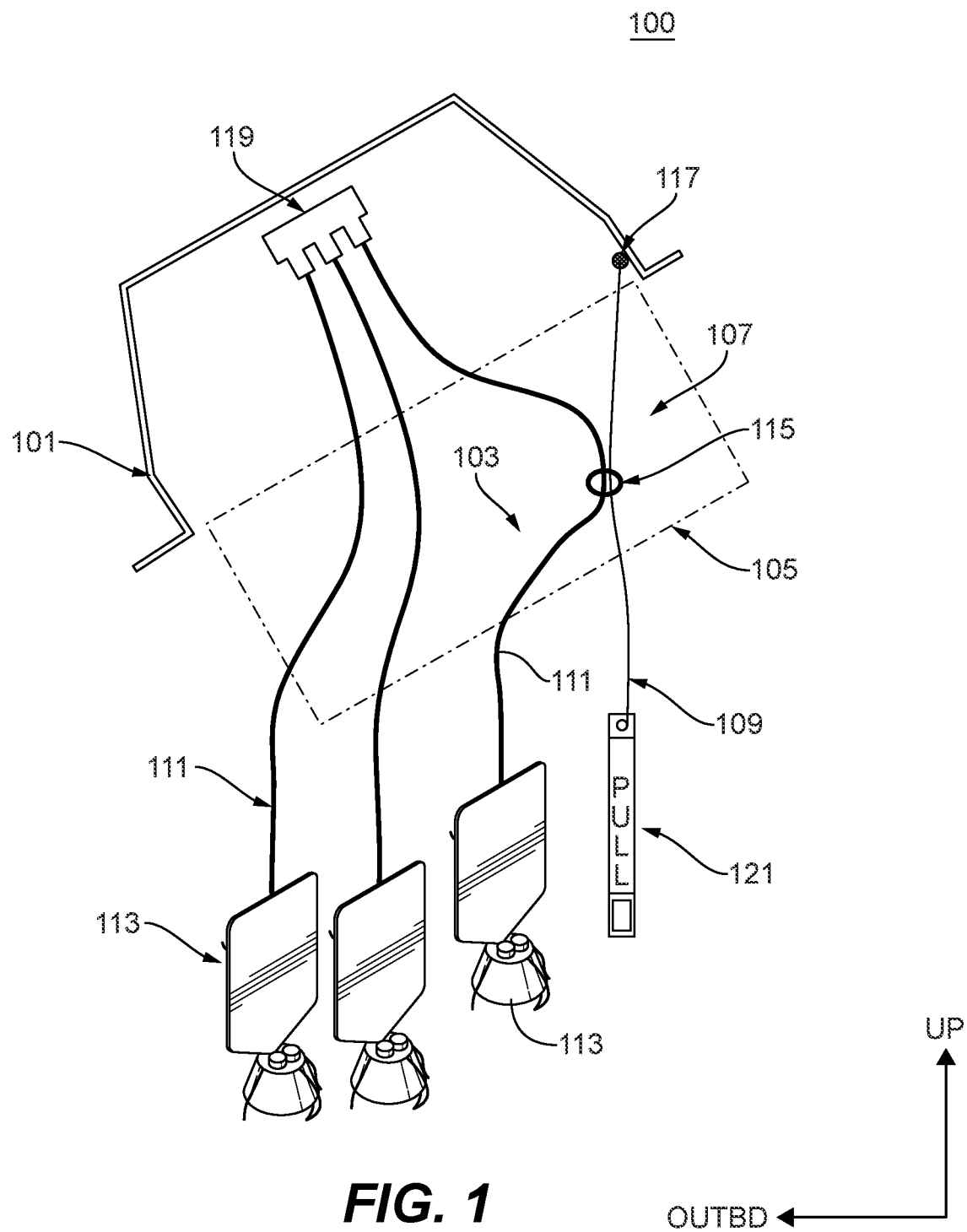
FIG. 1 is a schematic view of an embodiment of a supplement oxygen assembly in accordance with this disclosure.

Reference will now be made to the drawings wherein like reference numerals identify similar structural features or aspects of the subject disclosure. For purposes of explanation and illustration, and not limitation, an illustrative view of an embodiment of a supplemental oxygen assembly in accordance with the disclosure is shown in FIG. 1 and is designated generally by reference character 100. Other embodiments and/or aspects of this disclosure are shown in FIGS. 2-4E. Certain embodiments described herein can be used to provide larger seating areas with more privacy while still meeting regulatory and safety access requirements, for example.

Figure 2:
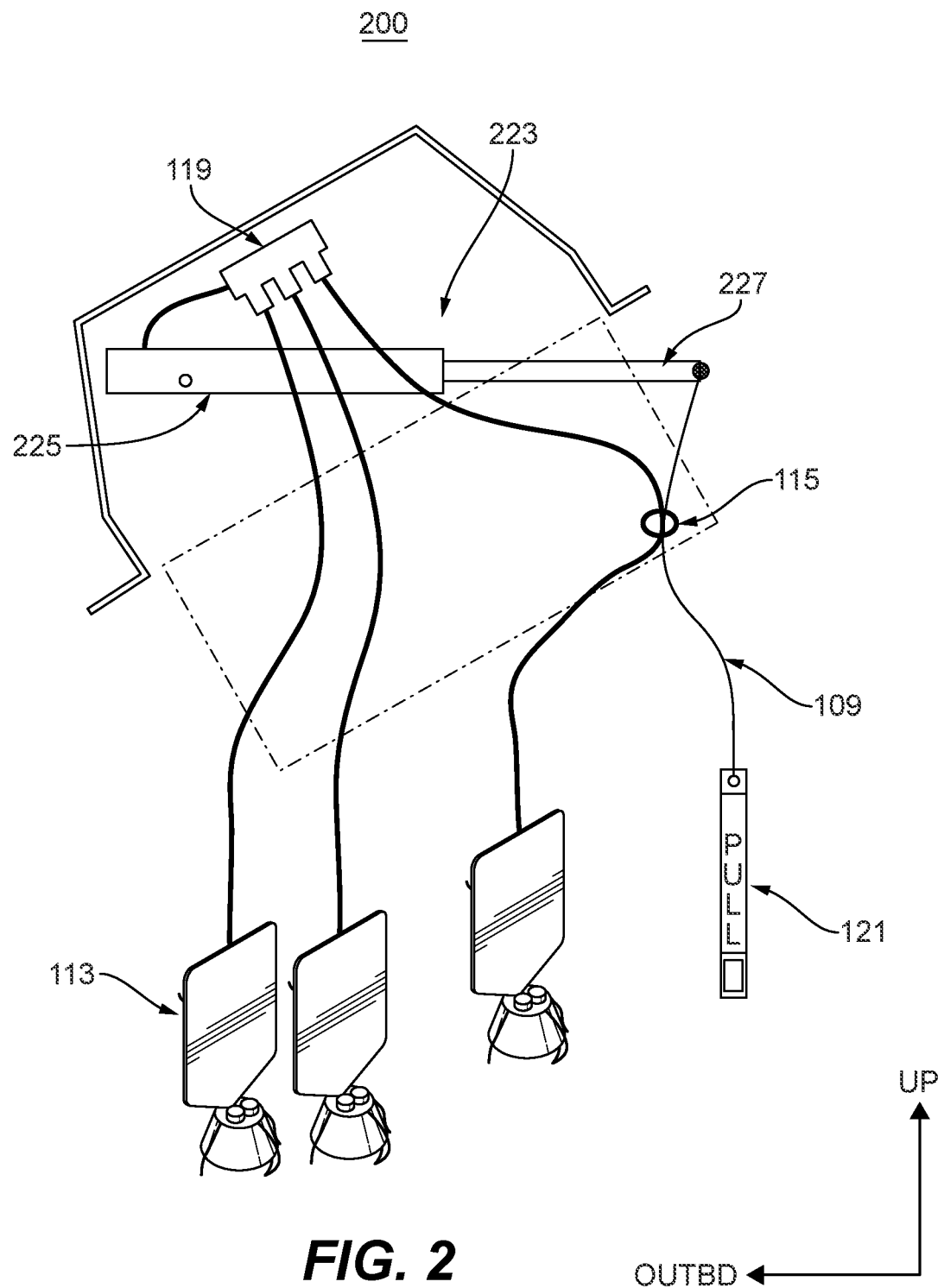
FIG. 2 is a schematic view of an embodiment of a supplement oxygen assembly in accordance with this disclosure.
Figure 3:
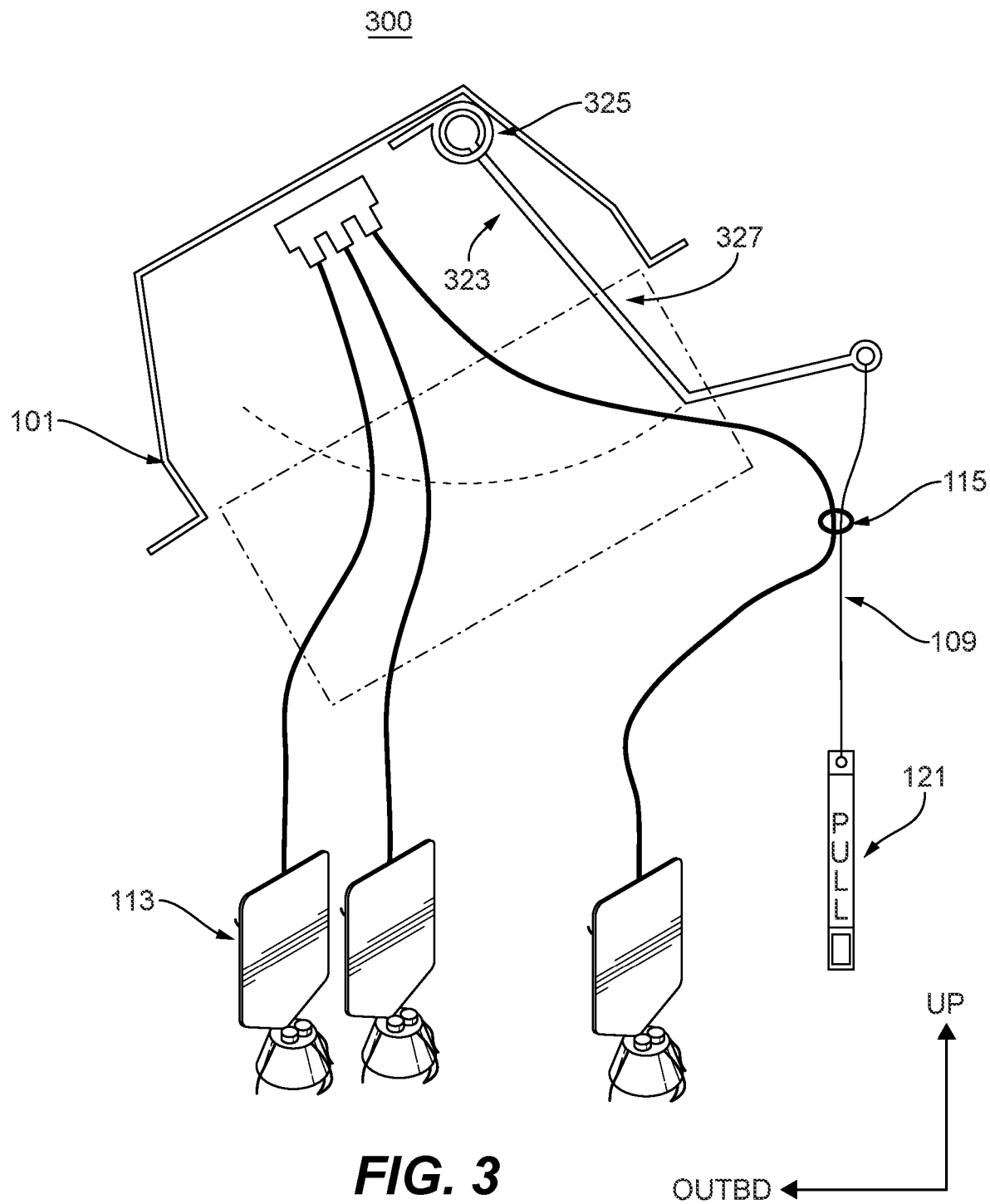
FIG. 3 is a schematic view of an embodiment of a supplement oxygen assembly in accordance with this disclosure.
Figure 4A:
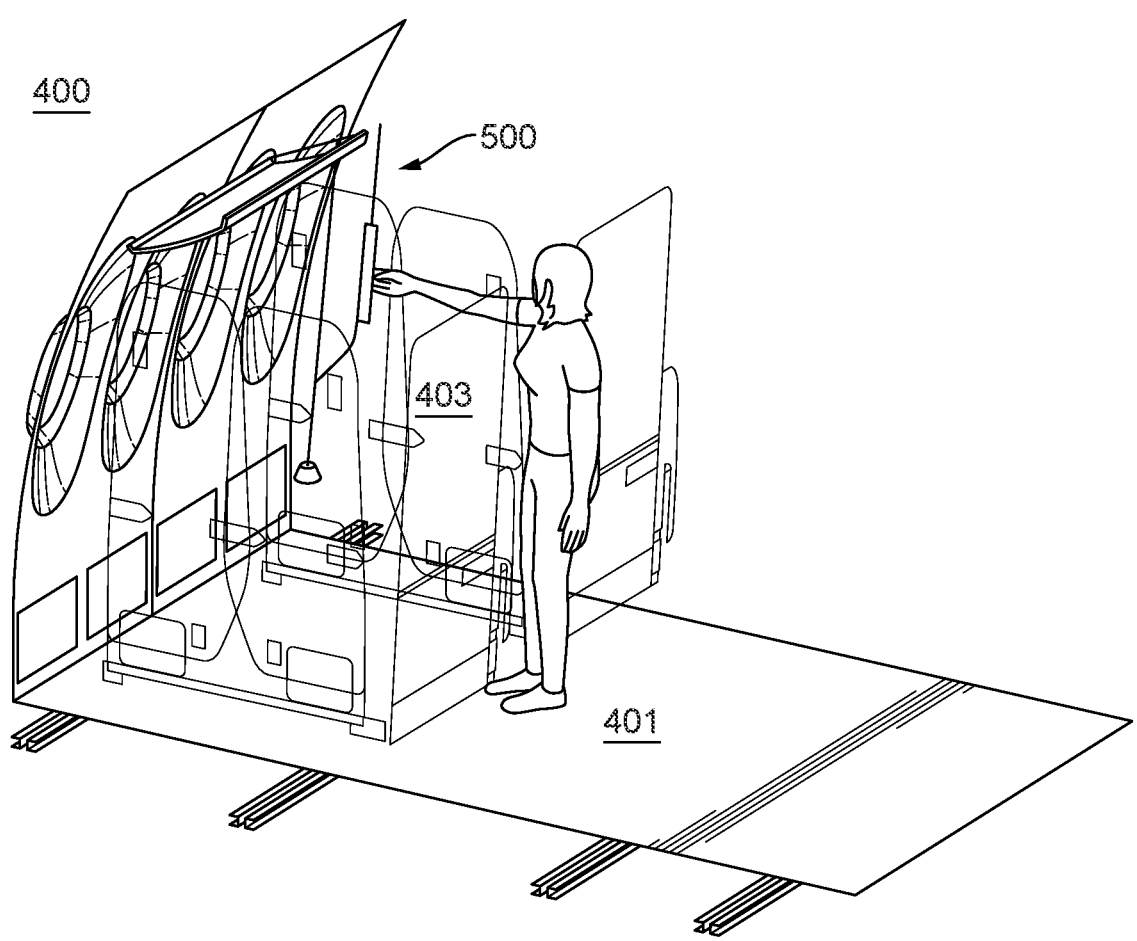
FIGS. 4A, 4B, 4C, 4D, and 4E show a first perspective view, a second perspective view, a rear elevation, a side elevation, and a top down plan view of an embodiment of a supplemental oxygen assembly being used in a deployed state, showing a crew member reaching from an aisle over a privacy barrier and to an extended lanyard attached to a flow assembly.
Figure 4B:
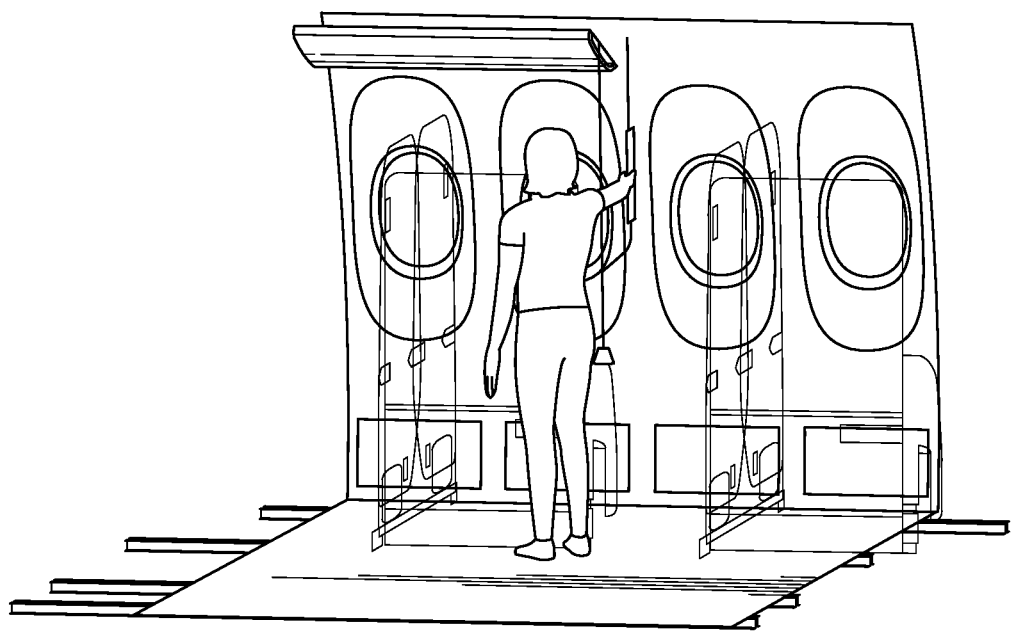
Figure 4C:
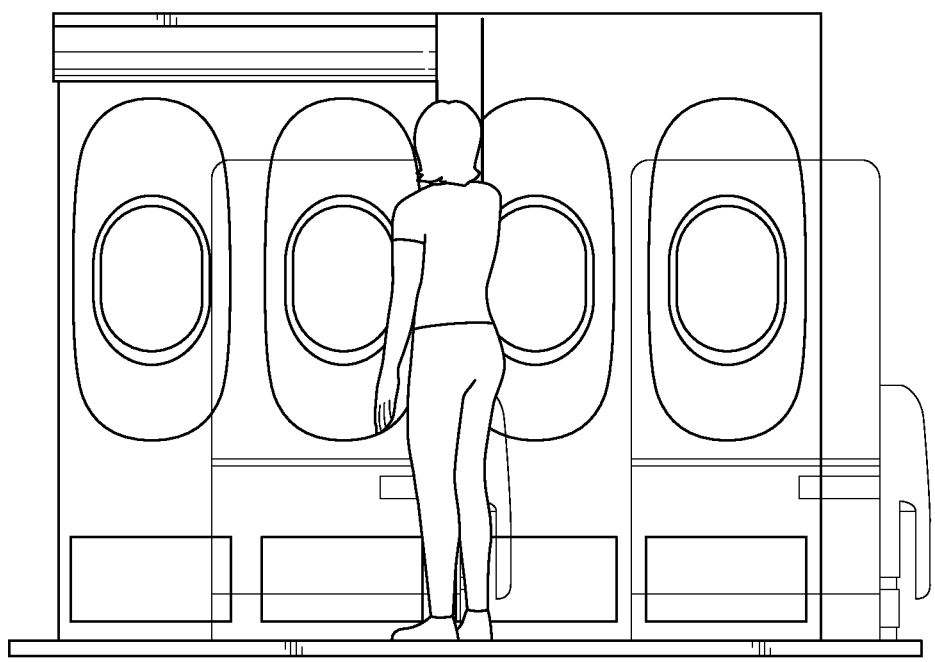
Figure 4D:
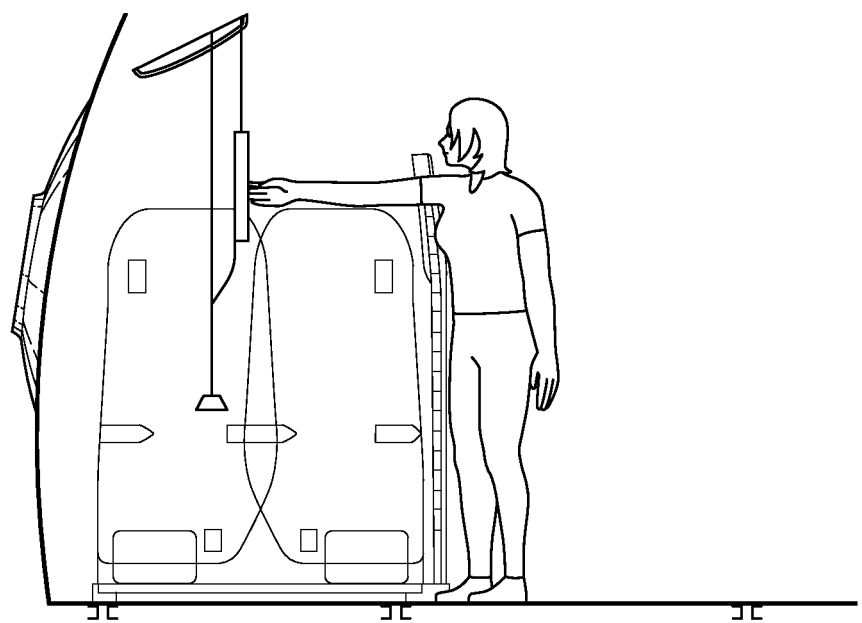
Figure 4E:
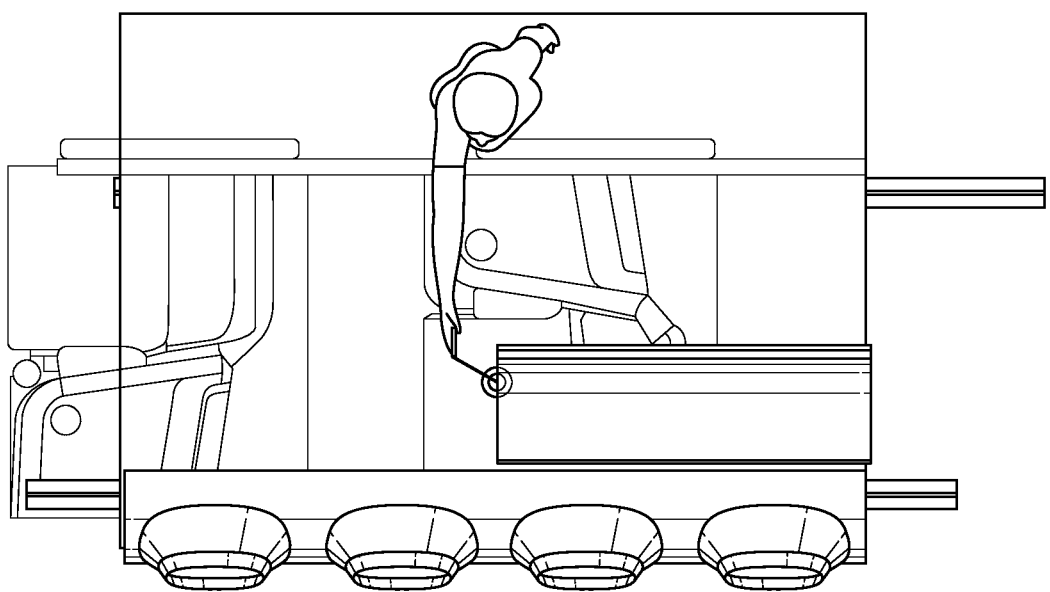

Referring to FIG. 1, a supplemental oxygen assembly 100 for a vehicle can include a container 101 and a flow assembly 103 attached to and/or configured to be contained within the container 101 in a stowed position and to extend from the container 101 in a deployed position (e.g., as shown in FIGS. 1-3, e.g., when door 105 is open). The flow assembly 103 can be configured to be connected to an oxygen supply (not shown, e.g., an oxygen tank or any other suitable supply appreciated by those having ordinary skill in the art) to supply oxygen to a person in the deployed position (e.g., in a cabin depressurization scenario).

The supplemental oxygen assembly 100 can include an extension device 107 connected to the flow assembly 103. The extension device 107 can be configured to extend or allow extension of the flow assembly 103 toward an aisle of the vehicle to aid the flow assembly 103 in being reached from or moveable toward an aisle of the vehicle by a person in the aisle.

As shown in FIG. 1, the extension device 107 can include a lanyard 109 connected to the flow assembly 103. The flow assembly 103 can include a hose 111 and a mask 113, for example. The lanyard 109 can be connected to the hose 111, for example (e.g., via a metal ring 115 or any other suitable attachment).

The lanyard 109 can be connected to an anchor 117 (e.g., an anchor screw attached to the container 101) in such a position as to be configured to weigh the flow assembly 103 toward the aisle in the deployed position (e.g., as shown pulling the hose 111 to the inboard/aisle direction). The hose 111 can be connected to a manifold 119 within the container 101, and the anchor 117 can be closer to the aisle (e.g., more inboard) than the manifold 119.

In certain embodiments, the supplemental oxygen assembly 100 can include a weighting streamer 121 connected to the lanyard 109 (e.g., with the text "PULL" thereon as shown). Any suitable weighting effect of the streamer 121 is contemplated herein (e.g., sufficient weight to pull the hose 111 and/or mask 113 and/or lanyard 109 sufficiently far enough to be reached by a person in the aisle).

Referring to FIGS. 2 and 3, the extension device 107 can include a moveable arm assembly 223, 323. The moveable arm assembly 223, 323 can be configured to be contained within the container 101 in the stowed position, and to extend the flow assembly 103 or a lanyard 109 attached to the flow assembly 103 toward the aisle in the deployed position (e.g., as shown).

Referring to FIG. 2, in certain embodiments, the moveable arm assembly 223 can be a telescoping arm assembly. For example, the telescoping arm assembly can include a biasing member 225 (e.g., an spring cylinder, and air cylinder) attached to the container 101, and a telescoping arm 227 biased toward the aisle by the biasing member 225 and attached to the flow assembly 103 or the lanyard 109 (e.g., the anchor 117 being attached to the telescoping arm 227) at a distal portion of the telescoping arm 227.

Referring to FIG. 3, in certain embodiments, the moveable arm assembly 323 can be a pivot arm assembly. The pivot arm assembly can include a torsional biasing member 325 (e.g., a torsional spring) attached to the container 101, and a pivot arm 327 biased by the torsional biasing member 325 and attached to the flow assembly 103 or the lanyard 109 (e.g., the anchor 117 being attached to the pivot arm 327) at a distal portion of the pivot arm 327.

In certain embodiments, the moveable arm assembly 223, 323 can extend beyond the container 101 toward the aisle (e.g., as shown in assemblies 200, 300 of FIGS. 2 and 3). Any suitable extension (e.g., at least sufficient to meet regulatory compliance based on a particular seating arrangement or passenger privacy barriers) is contemplated herein. Any suitable number of flow assemblies 103 per container 101 (e.g., one, two, three as shown) is contemplated herein (any suitable number of which can be connected to an extension device).

In accordance with at least one aspect of this disclosure, referring to FIGS. 4A-4E, a vehicle 400 (e.g., an aircraft) can include a supplemental oxygen assembly 500 as disclosed herein, e.g., assemblies 100, 200, 300 as described above. The vehicle 400 can include one or more aisles 401 and one or more passenger seats 403. The container 101 can be positioned over the one or more passenger seats, for example.

The vehicle can be an aircraft, for example. Any other suitable vehicle is contemplated herein (e.g., train, a low pressure enclosure, e.g., hyperloop, vehicle).

In certain systems, e.g., in aircraft supplemental oxygen systems, containers can include masks positioned to drop out over seats, and can have one masks than seats under the container. In certain vehicles, a privacy door can block access from the aisle, and presents a limiting factor of depth based on height-assumed regulations for emergency access.

In embodiments, an offset lanyard can project toward the aisle when deployed. A fabric streamer, for example, can help in grabbing the lanyard, and can also have weight to help weigh down the lanyard. Embodiments can extend toward aisle and aftward, dropdown point can be any suitable location or distance to aisle.

Wider business class seats or mini-suites with privacy doors can block emergency access to oxygen mask drops from the aisle. For interior compliance, in aircraft, it is a requirement that crew members can reach any of the excess oxygen drops while walking down the aisle in an emergency. Embodiments include an oxygen box that includes an extension device that can project a streamer on a lanyard so it drops at a location within reach of a "5% female" standing in the aisle.

The extension device can be actuated when the oxygen box door opens and to drop the oxygen masks. Embodiments can include a spring-loaded telescoping arm or a gravity assisted hinged arm that deploys at the same time, for example. Embodiments can include a fixed anchor inside the box if geometry permits, for example.

Embodiments can include an arm that dangles a streamer just below the stowbin at a strategic location within reach of the aisle. The bottom of the streamer can be attached by lanyard to a designated mask that can be pulled toward the crew member for emergency use, for example. Embodiments can allow for wider seats, higher suite enclosures, and taller privacy doors than traditional systems while still meeting regulations.

Those having ordinary skill in the art understand that any numerical values disclosed herein can be exact values or can be values within a range. Further, any terms of approximation (e.g., "about", "approximately", "around") used in this disclosure can mean the stated value within a range. For example, in certain embodiments, the range can be within (plus or minus) 20%, or within 10%, or within 5%, or within 2%, or within any other suitable percentage or number as appreciated by those having ordinary skill in the art (e.g., for known tolerance limits or error ranges).

The articles "a", "an", and "the" as used herein and in the appended claims are used herein to refer to one or to more than one (i.e., to at least one) of the grammatical object of the article unless the context clearly indicates otherwise. By way of example, "an element" means one element or more than one element.

The phrase "and/or," as used herein in the specification and in the claims, should be understood to mean "either or both" of the elements so conjoined, i.e., elements that are conjunctively present in some cases and disjunctively present in other cases. Multiple elements listed with "and/or"

should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of," "only one of," or "exactly one of."

Any suitable combination(s) of any disclosed embodiments and/or any suitable portion(s) thereof are contemplated herein as appreciated by those having ordinary skill in the art in view of this disclosure.

The embodiments of the present disclosure, as described above and shown in the drawings, provide for improvement in the art to which they pertain. While the subject disclosure includes reference to certain embodiments, those skilled in the art will readily appreciate that changes and/or modifications may be made thereto without departing from the spirit and scope of the subject disclosure.

What is claimed is:

1. A supplemental oxygen assembly for a vehicle, comprising:
   a container;
   a flow assembly attached to and/or configured to be contained within the container in a stowed position and to extend from the container in a deployed position, wherein the flow assembly is configured to be connected to an oxygen supply to supply oxygen to a person in the deployed position; and
   an extension device connected to the flow assembly, wherein the extension device is configured to extend or allow extension of the flow assembly toward an aisle of the vehicle to aid the flow assembly in being reached from or moveable toward an aisle of the vehicle by a person in the aisle, wherein the extension device includes a lanyard connected to the flow assembly, wherein the flow assembly includes a hose and a mask, wherein the lanyard is connected to the hose, wherein the lanyard is connected to an anchor in such a position as to be configured to weigh the flow assembly toward the aisle in the deployed position, wherein the hose is connected to a manifold within the container, and the anchor is closer to the aisle than the manifold.

2. The assembly of claim 1, further comprising a weighting streamer connected to the lanyard.

3. The assembly of claim 1, wherein the extension device includes a moveable arm assembly.

4. The assembly of claim 3, wherein the moveable arm assembly is configured to be contained within the container in the stowed position, and to extend the flow assembly or a lanyard attached to the flow assembly toward the aisle in the deployed position.

5. The assembly of claim 4, wherein the moveable arm is a telescoping arm assembly and includes:
   a biasing member attached to the container; and
   a telescoping arm biased toward the aisle by the biasing member and attached to the flow assembly or the lanyard at a distal portion of the telescoping arm.

6. The assembly of claim 4, wherein the moveable arm assembly is a pivot arm assembly and includes:
   a torsional biasing member attached to the container; and
   a pivot arm biased by the torsional biasing member and attached to the flow assembly or the lanyard at a distal portion of the pivot arm.

7. The assembly of claim 4, wherein the moveable arm assembly extends beyond the container toward the aisle.

8. The vehicle of claim 1, wherein the vehicle is an aircraft.

9. A vehicle, comprising:
   the supplemental oxygen assembly of claim 1.

10. The vehicle of claim 9, further comprising a weighting streamer connected to the lanyard.

11. The vehicle of claim 9, wherein the extension device includes a moveable arm assembly.

12. The vehicle of claim 9, wherein the vehicle includes one or more aisles and one or more passenger seats, wherein the container is positioned over the one or more passenger seats.

13. A supplemental oxygen assembly for a vehicle, comprising:
   a container;
   a flow assembly attached to and/or configured to be contained within the container in a stowed position and to extend from the container in a deployed position, wherein the flow assembly is configured to be connected to an oxygen supply to supply oxygen to a person in the deployed position;
   an extension device connected to the flow assembly, wherein the extension device is configured to extend or allow extension of the flow assembly toward an aisle of the vehicle to aid the flow assembly in being reached from or moveable toward an aisle of the vehicle by a person in the aisle, wherein the extension device includes a moveable arm assembly, wherein the moveable arm assembly is configured to be contained within the container in the stowed position, and to extend the flow assembly or a lanyard attached to the flow assembly toward the aisle in the deployed position, wherein the moveable arm is a telescoping arm assembly and includes:
   a biasing member attached to the container; and
   a telescoping arm biased toward the aisle by the biasing member and attached to the flow assembly or the lanyard at a distal portion of the telescoping arm.

14. A supplemental oxygen assembly for a vehicle, comprising:
   a container;
   a flow assembly attached to and/or configured to be contained within the container in a stowed position and to extend from the container in a deployed position, wherein the flow assembly is configured to be connected to an oxygen supply to supply oxygen to a person in the deployed position;
   an extension device connected to the flow assembly, wherein the extension device is configured to extend or allow extension of the flow assembly toward an aisle of the vehicle to aid the flow assembly in being reached from or moveable toward an aisle of the vehicle by a person in the aisle, wherein the extension device includes a moveable arm assembly, wherein the moveable arm assembly is configured to be contained within the container in the stowed position, and to extend the flow assembly or a lanyard attached to the flow assembly toward the aisle in the deployed position, wherein the moveable arm assembly is a pivot arm assembly and includes:

a torsional biasing member attached to the container; and a pivot arm biased by the torsional biasing member and attached to the flow assembly or the lanyard at a distal portion of the pivot arm.

* * * * *